March 29, 1960  W. A. BIERMANN ET AL  2,930,388
OIL CONTROL VALVE
Filed Oct. 30, 1957  4 Sheets-Sheet 1

INVENTORS
WILLIAM A. BIERMANN
LOURDES V. MCCARTY
BY
John W. Michael
ATTORNEY

March 29, 1960 W. A. BIERMANN ET AL 2,930,388
OIL CONTROL VALVE
Filed Oct. 30, 1957 4 Sheets-Sheet 2

INVENTORS
WILLIAM A. BIERMANN
LOURDES V. McCARTY
BY
ATTORNEY

INVENTORS
WILLIAM A. BIERMANN
LOURDES V. McCARTY
BY
John W. Michael
ATTORNEY

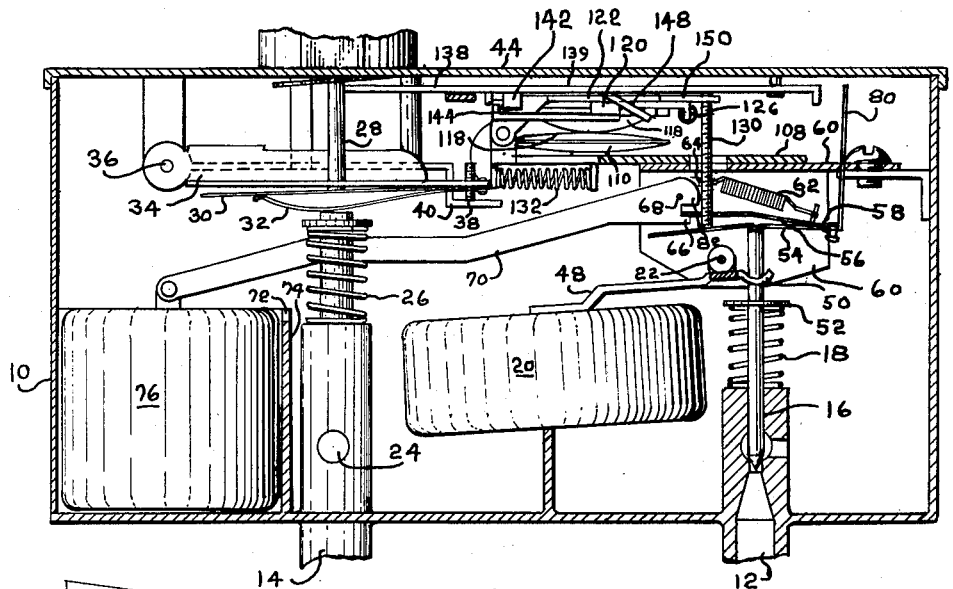
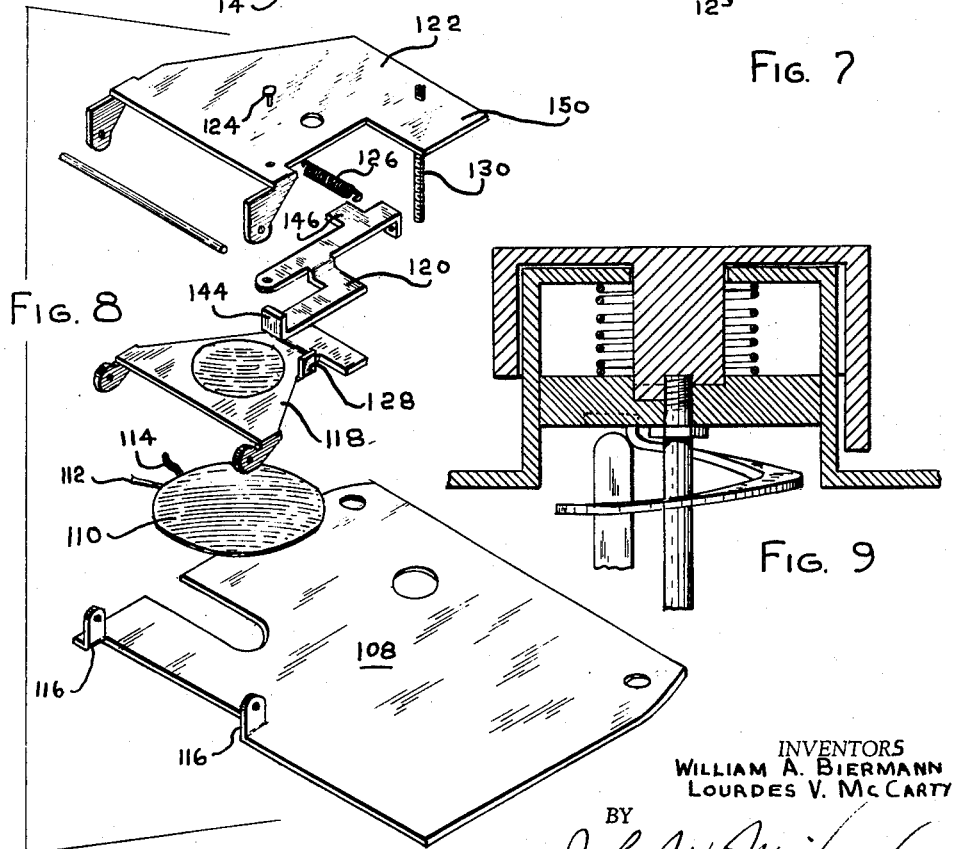
FIG. 7
FIG. 8
FIG. 9
INVENTORS
WILLIAM A. BIERMANN
LOURDES V. McCARTY
BY
John W. Michael
ATTORNEY

United States Patent Office 2,930,388
Patented Mar. 29, 1960

2,930,388

OIL CONTROL VALVE

William A. Biermann and Lourdes V. McCarty, Milwaukee, Wis., assignors to Controls Company of America, Schiller Park, Ill., a corporation of Delaware Application October 30, 1957, Serial No. 693,479

16 Claims. (Cl. 137—65)

This invention relates to an oil flow control valve and more particularly to the constant level oil flow control valve type customarily employed in conjunction with pot type burners.

An object of this invention is to provide a constant level oil control of the general type described with means for preventing flow to a burner in excess of a predetermined quantity in absence of combustion in the burner.

Another object of this invention is to provide a control having the features mentioned in the preceding paragraph and operative to supply one or two burners. In this form of the invention the safety device preventing flow in absence of combustion will operate to prevent flow in absence of combustion at either burner.

Controls of the constant level type have for some time been provided with auxiliary safety shut-off floats which operate to shut off the flow to the burner upon occurrence of an excessive level in the control indicative of faulty operation of the outlet valve. These auxiliary safety float mechanisms have been resettable. An object of this invention is to incorporate such an auxiliary safety float in a control having the features set out above and resettable by the same mechanism which is employed to charge the constant level control with oil initially.

When so constructed, after the operator has initiated combustion in the burner, or believes he has initiated combustion in the burner, and the burner fails to perform, a single control is actuated in order to restore the mechanism for a renewed attempt at obtaining combustion. Thus, when igniting a burner the present control is operative to supply only a predetermined quantity of oil to the burner and will prevent further flow unless there is, in fact, combustion at the burner. If combustion fails to occur or the fire goes out for any reason a new supply of oil must be provided in the constant level control. In order to obtain this new supply the outlet valve control knob is actuated in a prescribed manner which insures cutting off flow to the burner during the recharging operation. The same type of actuation is employed to reset the safety float if an excessive oil level has occurred. Therefore, the operator of the control valve need not analyze the reason underlying the failure of the burner to operate but has only to follow a prescribed resetting operation which will remedy either of the two possible causes.

The present flame sensing arrangement is operative even where a double valve control is employed to supply two burners. Thus, if the control is actuated to provide oil to one burner which is operating satisfactorily, and the control knob providing oil to a second burner is then actuated, the mechanism becomes immediately effective to limit the quantity of oil available to both burners and will act to shut off flow to both burners if combustion fails to occur in the burner just placed into service.

Other objects and advantages will be pointed out in, or be apparent from, the specification and claims, as will obvious modifications of the single embodiment shown in the drawings, in which:

Figure 7 is a vertical section of the double stem control;

Figure 8 is an exploded isometric view of the flame sensing control; and

Figure 9 is a somewhat schematic cross section of the control knob in its "off" position showing how the detent action (referred to hereinafter) is obtained.

Figure 1:
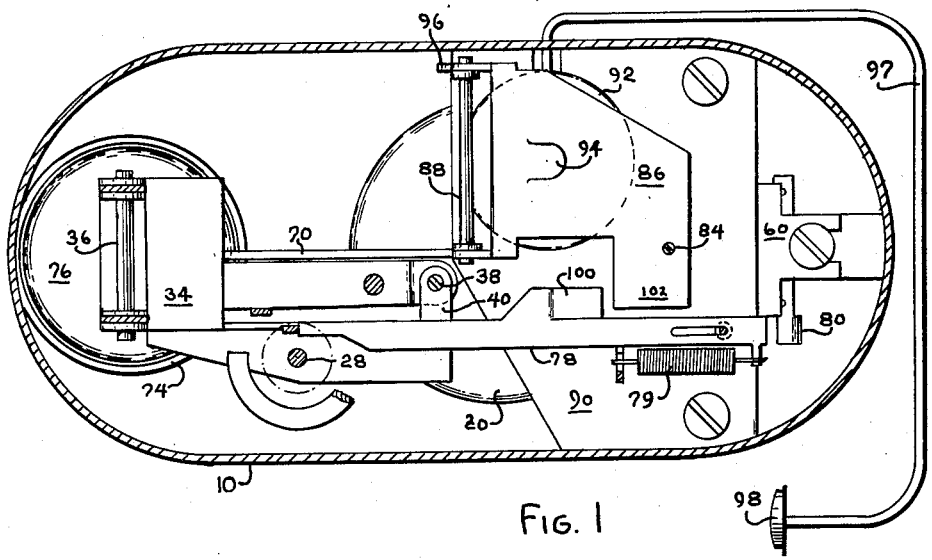
Figure 1 is a top plan view of the control device.
Figure 2:
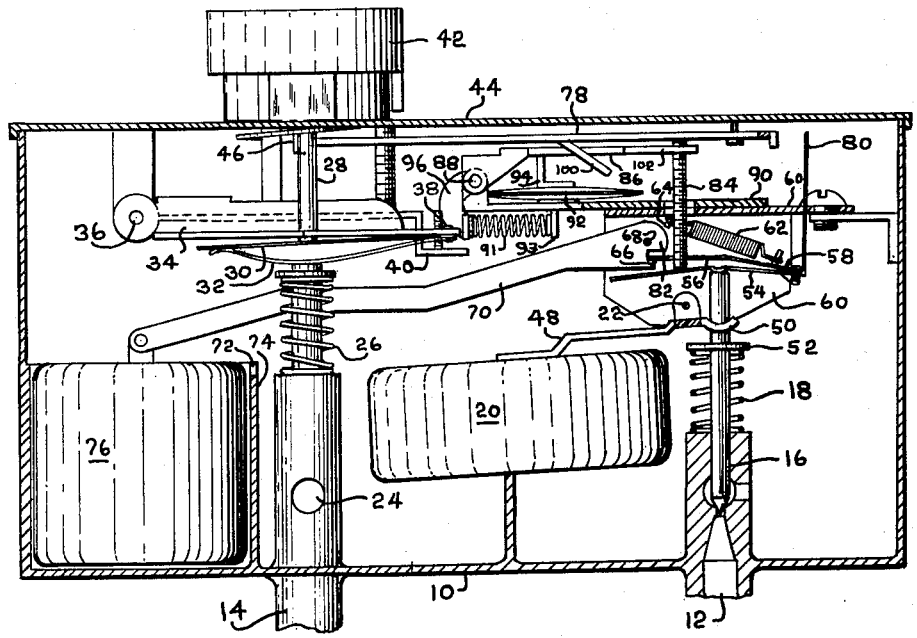
Figure 2 is a vertical section through the control device and shows both the inlet and the outlet valves closed.
Figure 3:
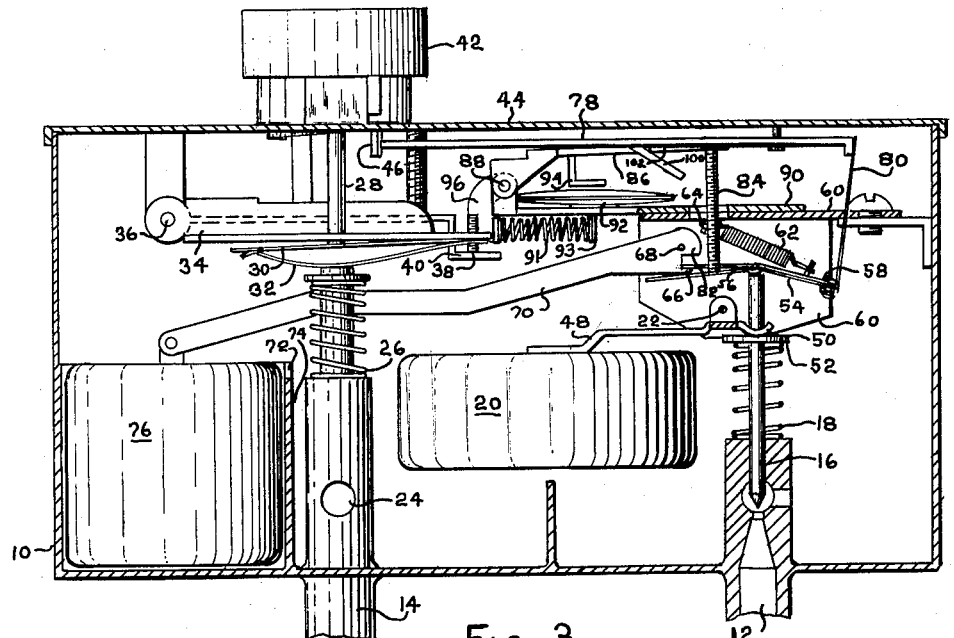
Figure 3 is similar to Figure 2 but shows the inlet valve manually opened against the closing force of the flame sensing mechanism.
Figure 4:
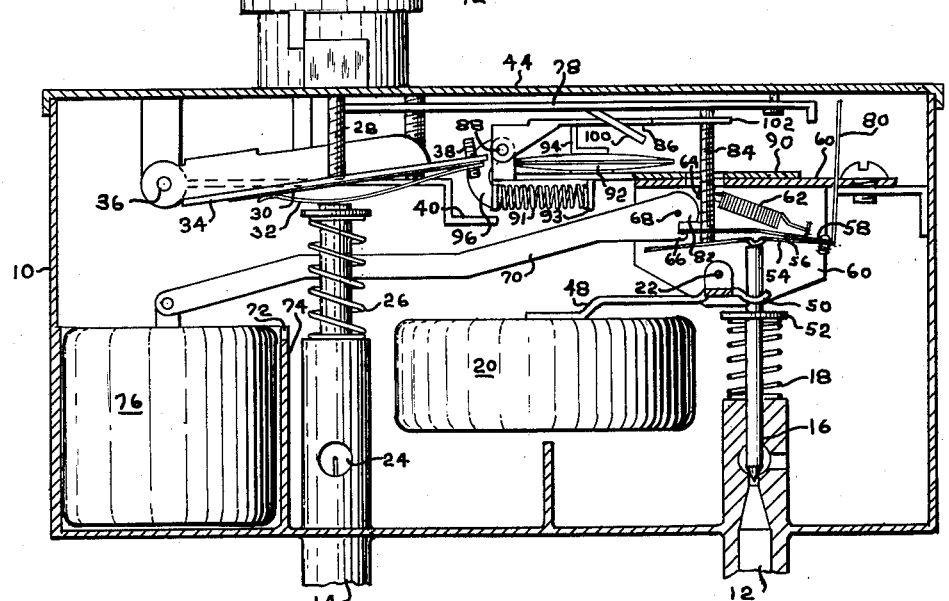
Figure 4 shows the outlet valve opened for the purpose of igniting the burner and at a time when the flame sensing mechanism has not yet sensed the heat of combustion.
Figure 5:
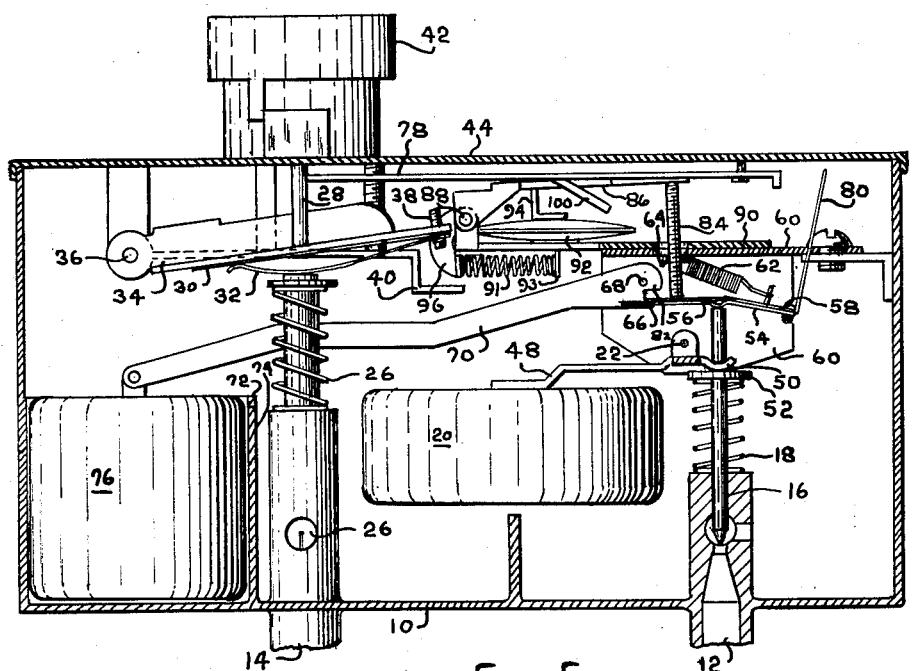
Figure 5 shows the outlet valve open and the inlet valve opened by reason of the action of the flame sensing mechanism.

Turning now to the detailed construction of the single outlet valve control shown in Figures 1 through 5, casing 10 is provided with an inlet 12 and an outlet 14. Inlet valve 16 is biased to the open position by spring 18 and is acted upon by float 20 pivoted at 22 to maintain a constant level in casing 10. Outlet valve 24 is biased by spring 26 in the valve opening direction and is acted upon by stem 28 through leaf spring 30 and the bowed biasing spring 32 carried by lever 34 pivoted at 36 and having an adjusting screw 38 in its free end for determining the limit of downward movement of the lever 34 upon contacting bracket 40. Any further downward movement of the stem 28 acts to flex the springs 30—32 to permit overtravel of the actuating stem 28. Actuating stem 28 is carried by knob 42 which is mounted on casing cover 44 in a well known manner. The knob also carried with it a depending finger 46 for purposes which will be explained more fully hereinafter.

As noted above, spring 18 biases inlet valve 16 towards the open position and float 20 is operative to act on the inlet valve to regulate the flow and maintain a constant level in the casing. The float is mounted on bracket 48 which is provided with bosses 50 on each side of the valve stem to act on the top side of valve shoulder 52 to regulate the action of the valve. The stem passes between these bosses and extends upwardly to be acted upon by lever 54. Lever 54 is pivotally connected to the right-hand end of striker plate 56 which pivots at notch 58 in mounting bracket 60 and is retained in the notch by tensioned spring 62 connected between the striker plate 56 and lug 64 struck downwardly from mounting bracket 60. The striker plate is prevented from contacting the top of lever 54 during normal operation since the left-hand end of the striker plate is retained by jaw 66 of the safety arm pivoted at 68. In the normal course, safety arm 70 will be in the position shown in the drawings. If, however, the oil level in the casing should rise above the bottom of weir 72 in dam 74 the auxiliary float 76 will rise and pivot the arm 70 about pivot point 68 to withdraw the jaw 66 from under the tip of striker plate 56 whereupon the force exerted by spring 62 will drive the striker plate downwardly to strike against the top surface of lever 54 to strike the inlet valve shut. This is a safety mechanism which comes into play only when the level in the casing is abnormally high and would be encountered, for example, if some dirt was wedged in the inlet valve seat and prevented complete closure of the inlet valve and resulted in oil flowing into the casing more rapidly than it flows out of the outlet valve.

The auxiliary float and striker plate constitute a safety mechanism. Such mechanisms have been utilized heretofore in conjunction with constant level valves but have required a reset arm extending outside the casing for manual actuation. The present reset is actuated merely by turning the control knob 42 past the position in which the outlet valve has been closed. Thus the valve, if open, is turned to the off position and the closing movement is then continued until lug 46, depending from the knob, swings around to act on the end of slide bar 78 and this motion is transmitted to finger 80 projecting upwardly from lever 54. This rocks lever 54 in a clockwise direction about its pivot to act on the underside of striker 56 and raise the free end of the striker against the nose portion 82 of auxiliary float arm 70 to force the float 76 down into the well into which it is normally housed and make the oil flow back into the main casing. Since after operation of the safety mechanism the inlet valve is shut and the outlet valve is free to continue to drain oil from the casing the oil flowing back into the main chamber of the casing upon actuation of the resetting mechanism has plenty of space in to which it may flow. It will be noted that during the resetting of the safety mechanism there can be no flow to the burner due to the fact that the manual knob must first be actuated to close the outlet valve before any resetting motion is transmitted to the float arm 70.

Pin 84 is threaded in the free or right-hand end of control lever 86 and passes through a cooperating hole in the striker plate 56 to act on idler lever 54 and transmit motion to the lever 54. Lever 86 is pivoted at 88 to a mounting bracket 90. Spring 91 is compressed between lug 93 struck downwardly from plate 90 and finger 96 depending from lever 86 to thereby bias lever 86 in a valve closing direction. The force of spring 91 is transmitted to plate 54 for closing the valve whenever the mechanism is free to do so.

Mounted on bracket 90 is a diaphragm 92. The bottom of the diaphragm assembly 92 is mounted on bracket 90 and the top acts on follower 94 which depends from the underside of control lever 86. The diaphragm assembly is connected by capillary tubing 97 to a heat sensing button or member 98 which is suitably charged to expand the diaphragm assembly upon sensing the heat of combustion at a burner.

When the temperature responsive member 98 senses the heat of combustion in the burner, the diaphragms expand and control lever 86 is raised to raise screw 84 which will permit lever 54 to rise (assuming the float 20 calls for an increase in level in the casing). To this point it will be apparent that, starting with a filled casing, if the outlet valve is opened and the oil flow into the burner is ignited, only that amount of oil in the casing at the start can flow to the burner since the diaphragm has not expanded to indicate a flame in the burner. After the heat sensing member 98 senses the heat of combustion in the burner the diaphragms expand and permit the inlet valve to open under control of the main float 20 to thereafter maintain the desired level in the casing. If oil flows into the casing too fast the oil level will rise until the safety striker mechanism is actuated to punch inlet valve closed.

Since, in the absence of combustion in the burner, the inlet valve is held shut, there obviously can be no flow into the casing unless means are provided for opening the inlet valve. For this purpose the slide bar 78, which is actuated by lug 46 depending from control knob 42, is provided with a downwardly inclined cam finger 100 which is adapted to slide under end 102 of control lever 86 to lift the control lever 86 temporarily and in opposition to the force of compressed spring 91 to permit inlet valve to open to raise the level in the casing to the normal level. During this time it will be appreciated that the outlet valve is closed since the lug 46 cannot be brought against the end of slide bar 78 until the valve has been closed. Therefore, it is impossible to open the outlet valve at the same time the inlet valve is manually opened. Similarly, it is, as explained above, impossible to open the outlet valve during such time as the striker mechanism is being reset. From this it will be seen that a very considerable degree of safety has been provided. In addition to this considerable degree of safety it will be appreciated that if the burner goes out after the operator has ignited the burner, or believes that he has lit the burner, he has only to actuate knob 42 to the "off" position and continue the motion to either recharge the control with oil or to reset the striker mechanism. The cause of the situation need not concern him since the same actuation is utilized to put the control back into operation regardless of which of the two causes has occasioned the lack of heat from the burner.

Figure 6:
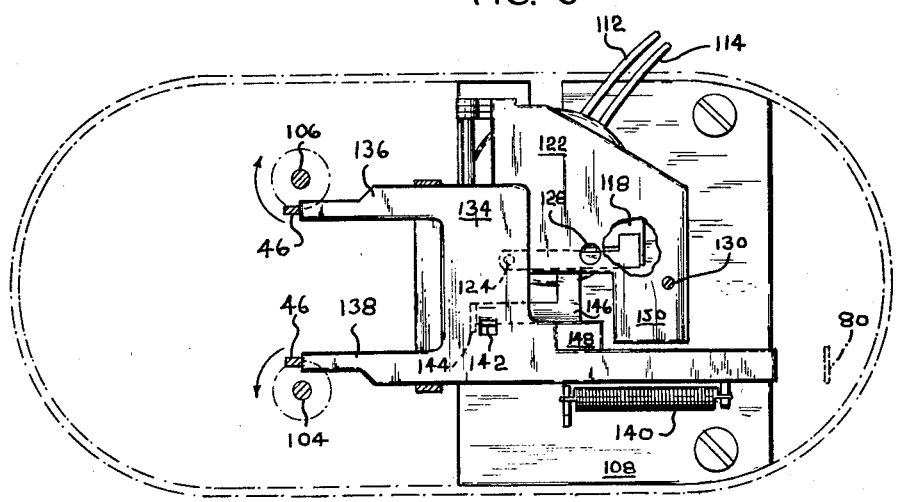
Figure 6 is a top plan view of the essential structure of a control valve provided with two outlet valves.

The modification of the Figures 6 through 8 is the same as the first modification insofar as the inlet valve and auxiliary float mechanism is concerned. The control is provided with two outlet valves, 104, 106 which are designed to supply two separate burners. The flame prover mechanism is generally similar to that described with respect to the first embodiment and includes the mounting bracket 108 carried on bracket 60. Here the diaphragm assembly 110 is connected by capillary tubes 112, 114 to two separate heat sensing buttons (not shown) each adapted to be connected to one of the burners. The mounting plate 108 has upwardly struck mounting ears 116, 116 on which the diaphragm follower 118 is pivotally mounted. As the diaphragm assembly expands the diaphragm follower will be lifted up to transmit the motion. Positioned to one side of the diaphragm follower is a shear member or spacer 120 pivotally carried by the control lever 122 on pin 124. A spring 126 tensioned between spacer 120 and a bracket on the underside of the control lever 122 biases the shear member in a direction tending to move the shear member under the control lever 122 and interposing the shear member between the diaphragm follower 118 and the control lever 122. The spring 126 pulls the spacer as far as permitted by stop 128 standing up from the cam follower 118.

The control lever 122 is connected to the idler lever 54 by means of threaded pin 130. The heat of combustion in one burner will expand the diaphragm assembly 110 approximately an amount equal to the thickness of spacer 120 and this is sufficient to lift the control lever 122 to a point where the inlet valve 16 is free to operate under control of the main float 20. If only one heat sensing member is hot and the spacer is withdrawn from between the control lever 122 and the diaphragm follower 118 the control lever 122 will drop under the influence of compressed spring 132 and act through pin 130 to close the inlet valve.

The slide bar 134 corresponding to slide bar 78 in the first embodiment has two arms 136, 138 which may be acted upon by the lugs 46 depending from each of the outlet valve control knobs. When one of the outlet valves is opened the lug 46 on the other valve keeps the slide bar in its normal position. When the other valve is opened (the first valve still being open) there is no lug 46 restraining movement of the slide bar 134 under the influence of tensioned spring 140 and the slide bar 134 now moves to the left (Figure 6) so that the downwardly struck finger 142 will engage the upstanding lug 144 on the spacer 120 to rotate the spacer about its pivot 124 against the bias of spring 126 to pull the finger 146 from between the control lever 122 and the follower 118. This now results in the inlet valve being closed and limits the oil supply available to both burners to that quantity in the casing. The second burner is now ignited and if the second burner comes up to heat sufficient the diaphragm assembly will expand an amount sufficient to make up for the absence of the spacer 146 and lift the control lever 122 sufficiently to restore the inlet valve to control by the main float 20. If, however, combustion fails to occur in the second burner before the quantity of oil in the casing is exhausted, both burners will be shut down.

In order to restore the control to operation, each knob for each outlet valve is turned to the "off" position and then either one can be actuated past the "off" position to move the slide bar 134 to the right so that the downwardly inclined camming finger 148 can act under the end 150 of control lever 122 to lift the control lever temporarily and thus allow the inlet valve to open to refill the casing.

It will be appreciated that the striker mechanism is reset just as with the other embodiment. When the slide bar 134 is moved to the right by the lug 46 of either of the outlet valves the extreme end of the slide bar will act against the upstanding finger 80 to reset the striker in the jaw of lever 70.

In the single outlet modification spring 79 biases slide bar 78 to the left so manual force must be maintained on the knob 42 to hold the inlet valve open until the level has risen to the desired level. As soon as the knob is released the spring acting through bar 78 will return the knob to the "off" position. This knob is of the general type shown in Patent No. 2,506,937 where the knob follows a cam surface having a steep rise leaving the "off" position. This results in a "detent" type action at "off" serving to accurately index the knob. As the spring 79 drives the knob towards "off" the knob will stop at the steep rise. The same type of action and knob is used in the double outlet modification where the spring 140 acting on bar 134 will return either or both knobs 104, 106 to the "off" position but does not have enough force to drive the knobs past the off position due to the steep rise in the cam surface. However, after one valve has been opened and the second is then opened the spring will move bar 134 further to the left whereupon finger 142 acts on lug 144 to pull spacer 146 from between lever 122 and follower 118. It will be appreciated that it would be possible to open one outlet and use the other to manually open the inlet, thus making it possible to pass oil directly through the control to one burner and to effectively by-pass the flame prover control temporarily. This can only be done with the double stem modification and is not too serious since the operator would have to hold the knob manually against the strong force of spring 140 and this would not likely be continued for long.

Although but one embodiment of the present invention has been illustrated and described, it will be apparent to those skilled in the art that various changes and modifications may be made therein without departing from the spirit of the invention or from the scope of the appended claims.

We claim:

1. A fuel flow control device comprising, a casing having an inlet and outlet, a valve for the inlet and a valve for the outlet, a float normally operable to control movement of the inlet valve to maintain a given level in the casing, means operative to hold the inlet valve closed regardless of the float action and responsive to a condition to restore control of the inlet valve to the float, means for manually overriding the condition responsive means and connected to the outlet valve for closing the outlet valve when the manual means acts to override the condition responsive means.

2. A fuel control device according to claim 1 in which said manual means is operatively connected to the outlet valve for controlling the opening thereof, said condition responsive means acting to hold the inlet valve shut when the outlet valve is opened until the heat of combustion actuates the responsive means to restore control of the inlet valve to the float.

3. A fuel flow control according to claim 2 in which the responsive means includes control means movable between positions in which the inlet valve is held shut and the inlet valve is under control of the float, means biasing the control means to the position in which the inlet valve is held shut and condition responsive motor means operative to move the control means to its other position.

4. A control according to claim 3 in which the casing has two outlets and a separate valve for each outlet, a separate manual control for each valve, said condition responsive means being responsive to conditions at two separate remote points and being operative to hold the inlet valve shut in absence of the condition at either point when one outlet valve is open and to hold the inlet valve shut in absence of the condition at one point when only one outlet valve is open.

5. A control device according to claim 4 in which the motor means has a given movement in response to the response condition at either point and a greater movement in response to the response condition at both points, the equivalent of said greater movement being necessary to restore the inlet valve to control by the float, means normally interposed between the motor means and the control means to render the condition responsive means operative to restore the inlet valve to control by the float in response to the condition at only one point, and means for withdrawing said interposed means whenever both outlet valves are opened.

6. A control device according to claim 5 including resettable means responsive to an abnormally high level in the casing to forcibly close the inlet valve, and means operable by either of the manual controls for the outlet valves for resetting the resettable means.

7. A control according to claim 6 in which the movement imparted to the manual control to reset the resettable means is the same movement imparted to the manual control to over ride the condition responsive means.

8. An oil control device of the type having a casing provided with inlet and outlet valves, a float connected to the inlet valve for maintaining a constant level in the casing, manually operable means for controlling the outlet valve, means biasing the inlet valve closed, condition responsive means operative to overcome said biasing means to thereby permit control of the inlet valve by said float, and means operated by said manual means for overcoming said biasing means and operative only when said outlet valve is closed.

9. A device according to claim 8 including resettable safety means responsive to an abnormally high fuel level within the casing to close said inlet valve, and means operated by said manual means for resetting said resettable safety means.

10. A fuel control according to claim 9 in which the resetting means is operable only when said outlet valve is closed.

11. A fuel control device comprising a casing having an inlet valve and two outlet valves, separate independent manually operable means for each of the two outlet valves for regulating movement of the outlet valves, means urging the inlet valve shut, condition responsive means operative to overcome said urging means, a float for regulating movement of the inlet valve when the condition responsive means has been overcome, means operatively connected to both of said manual means for temporarily overcoming said urging means when the valve associated with the manual means is fully closed.

12. A fuel control device according to claim 11 in which said condition responsive means is operative to overcome said urging means when only one of the outlet valves is open, means rendering the responsive means inoperative to overcome said urging means upon opening of the other of the outlet valves, said condition responsive means becoming operative to again overcome said urging means upon occurrence of a further response condition.

13. A fuel flow control device comprising a casing having an inlet valve and two outlet valves, a separate manual control for each outlet valve, a float operative to regulate the inlet valve to maintain a given level in the casing, control means operatively connected to the inlet valve and movable between a first position in which the inlet valve is held shut and a second position in which the inlet valve is free to open subject to control by the float, means biasing the control means to the first position, means responsive to a remote condition to move the control means to said second position when one outlet valve is open and responsive to two remote conditions to move the control means to said second position when both outlet valves are open.

14. A fuel flow control device according to claim 13 including manual means for temporarily moving the control means to said second position.

15. A control device according to claim 14 in which the manual means is operatively connected to both of said manual controls and may be operated by either manual control after the manual control is first moved to close the outlet valve.

16. A control device according to claim 13 in which the condition responsive means includes motor means having a predetermined movement for each of the two remote conditions, the aggregate movement imparted in response to the two conditions being necessary to move the control means to the second position, the condition responsive means including means operative only when only one outlet valve is open to increase the effective initial movement of the motor means whereby the added movement imparted thereto in response to one remote condition is equal to the required aggregate movement.

References Cited in the file of this patent

UNITED STATES PATENTS

| | | |
|---|---|---|
| 1,780,357 | Metcalfe | Nov. 4, 1930 |
| 1,803,879 | Tapp | May 5, 1931 |
| 2,592,913 | Landon | Apr. 15, 1952 |
| 2,774,372 | McCarty | Dec. 18, 1956 |